(12) United States Patent
Cohen

(10) Patent No.: US 11,739,883 B2
(45) Date of Patent: Aug. 29, 2023

(54) CORROSION SENSOR FOR STORAGE TANK

(71) Applicant: Paul A. Cohen, Victoria, TX (US)

(72) Inventor: Paul A. Cohen, Victoria, TX (US)

( * ) Notice: Subject to any disclaimer, the term of this patent is extended or adjusted under 35 U.S.C. 154(b) by 243 days.

(21) Appl. No.: 17/022,809

(22) Filed: Sep. 16, 2020

(65) Prior Publication Data

US 2020/0408361 A1 Dec. 31, 2020

Related U.S. Application Data

(62) Division of application No. 15/813,846, filed on Nov. 15, 2017, now Pat. No. 10,781,974.

(60) Provisional application No. 62/440,095, filed on Dec. 29, 2016.

(51) Int. Cl.
*F17C 3/12* (2006.01)
*G01N 17/02* (2006.01)
*G01N 17/04* (2006.01)

(52) U.S. Cl.
CPC ............. *F17C 3/12* (2013.01); *G01N 17/02* (2013.01); *G01N 17/043* (2013.01); *B32B 2307/714* (2013.01)

(58) Field of Classification Search
None
See application file for complete search history.

(56) References Cited

U.S. PATENT DOCUMENTS

| 5,728,943 | A | 3/1998 | Colter, Jr. et al. |
| 7,107,154 | B2 | 9/2006 | Ward |
| 2006/0077379 | A1* | 4/2006 | Frot ............... G01N 17/04 250/573 |
| 2014/0354426 | A1 | 12/2014 | Luybyanitsky |
| 2017/0030825 | A1* | 2/2017 | Goodwin ......... G01N 17/04 |
| 2017/0284966 | A1 | 10/2017 | Kosel et al. |

FOREIGN PATENT DOCUMENTS

| EP | 2081009 A1 * | 7/2009 | ............ G01N 17/04 |
| EP | 2081009 A1 | 7/2009 | |

* cited by examiner

*Primary Examiner* — Matthew D Krcha
(74) *Attorney, Agent, or Firm* — Patterson + Sheridan, LLP

(57) ABSTRACT

Embodiments of disclosure generally relate to corrosion sensors for storage tank applications, using corrosion responsive members and sensors to monitor corrosion in storage tanks, and methods for monitoring corrosion in a storage tank using the corrosion sensors. In one embodiment, a corrosion sensor for a storage tank comprises one or more sensors located on a non-process side of the storage tank and one or more corrosion responsive members located internal to the one or more sensors. The one or more sensors are configured to monitor a change in one or more physical properties of the one or more corrosion responsive members. Data from the corrosion sensor may be monitored locally or transmitted over a network and monitored remotely.

6 Claims, 3 Drawing Sheets

CORROSION SENSOR FOR STORAGE TANK

CROSS-REFERENCE TO RELATED APPLICATIONS

This is a divisional application of co-pending U.S. patent application Ser. No. 15/813,846, filed on Nov. 15, 2017, which claims benefit of U.S. Provisional Patent Application Ser. No. 62/440,095, filed on Dec. 29, 2016, each of which is herein incorporated by reference in its entirety.

BACKGROUND

Field

Embodiments of the present disclosure generally relate to corrosion sensors for storage tank applications. More particularly, the disclosure relates to the use of corrosion responsive members and sensors to monitor corrosion in storage tanks.

SUMMARY

In one embodiment, a method of monitoring corrosion in a storage tank includes monitoring a change in one or more physical properties of one or more corrosion responsive members using one or more sensors, wherein the one or more sensors are located on a non-process side of the storage tank and wherein the one or more corrosion responsive members are located internal to the one or more sensors.

In another embodiment, a corrosion sensor for a storage tank comprises one or more sensors located on a non-process side of the storage tank and one or more corrosion responsive members located internal to the one or more sensors, wherein the one or more sensors are configured to monitor a change in one or more physical properties of the one or more corrosion responsive members. The corrosion responsive members may be magnets, and the monitoring may comprise monitoring a change in the magnetic field strength of the magnets resulting from degradation of the magnets. The corrosion responsive members may be embedded in the tank sidewall, which may comprise a corrosion laminate. The corrosion responsive members may be positioned within a coupon mounted on a flanged nozzle or directly on the tank sidewall. The coupon may comprise inner surface layers, wherein the corrosion responsive members may be embedded in the inner surface layers. The corrosion responsive members may be embedded in the inner surface layers at different distances from the process side of the coupon. Data from the corrosion sensor may be monitored locally or transmitted over a network and monitored remotely.

In yet another embodiment, a method of determining the rate of corrosion in a storage tank includes recording a start time for corrosion in the storage tank, detecting a corrosion alarm time indicative of a corrosion distance into a tank sidewall by detecting degradation of one or more corrosion responsive members using one or sensors, wherein the one or more sensors are located on a non-process side of the storage tank and wherein the one or more corrosion responsive members are located internal to the one or more sensors, recording a corrosion time as a time elapsed between the start time and the corrosion alarm time, and determining the rate of corrosion based on the corrosion alarm time and the corrosion distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to the use of a corrosion sensor for use in a storage tank. Embodiments of disclosure generally relate to corrosion sensors for storage tank applications, using corrosion responsive members and sensors to monitor corrosion in storage tanks, and methods for monitoring corrosion in a storage tank using the corrosion sensors. In one embodiment, a corrosion sensor for a storage tank comprises one or more sensors located on a non-process side of the storage tank and one or more corrosion responsive members located internal to the one or more sensors. The one or more sensors are configured to monitor a change in one or more physical properties of the one or more corrosion responsive members. Data from the corrosion sensor may be monitored locally or transmitted over a network and monitored remotely.

Figure 1:
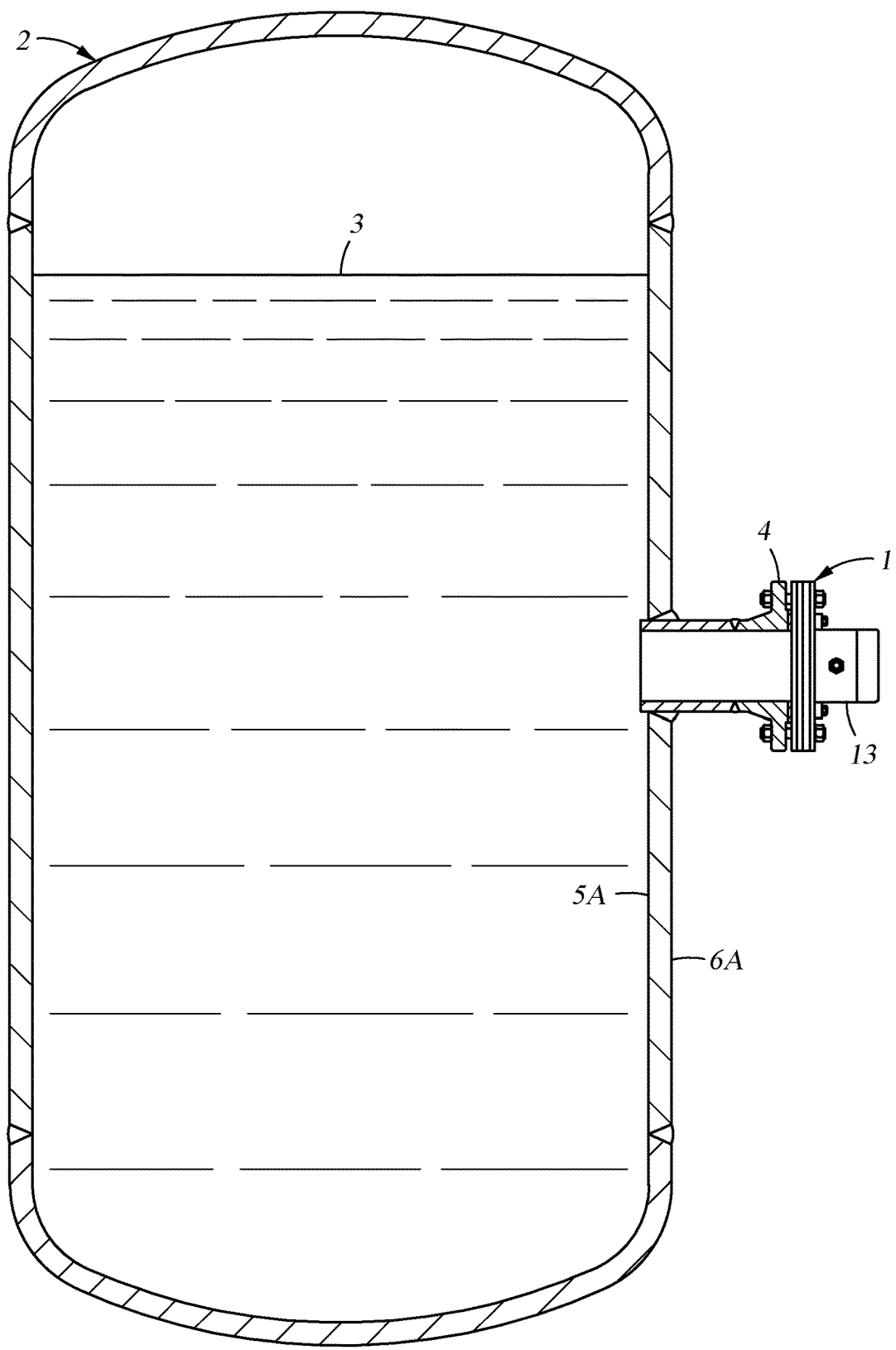
FIG. 1 is a schematic of a storage tank in an embodiment of this disclosure.
Figure 3:
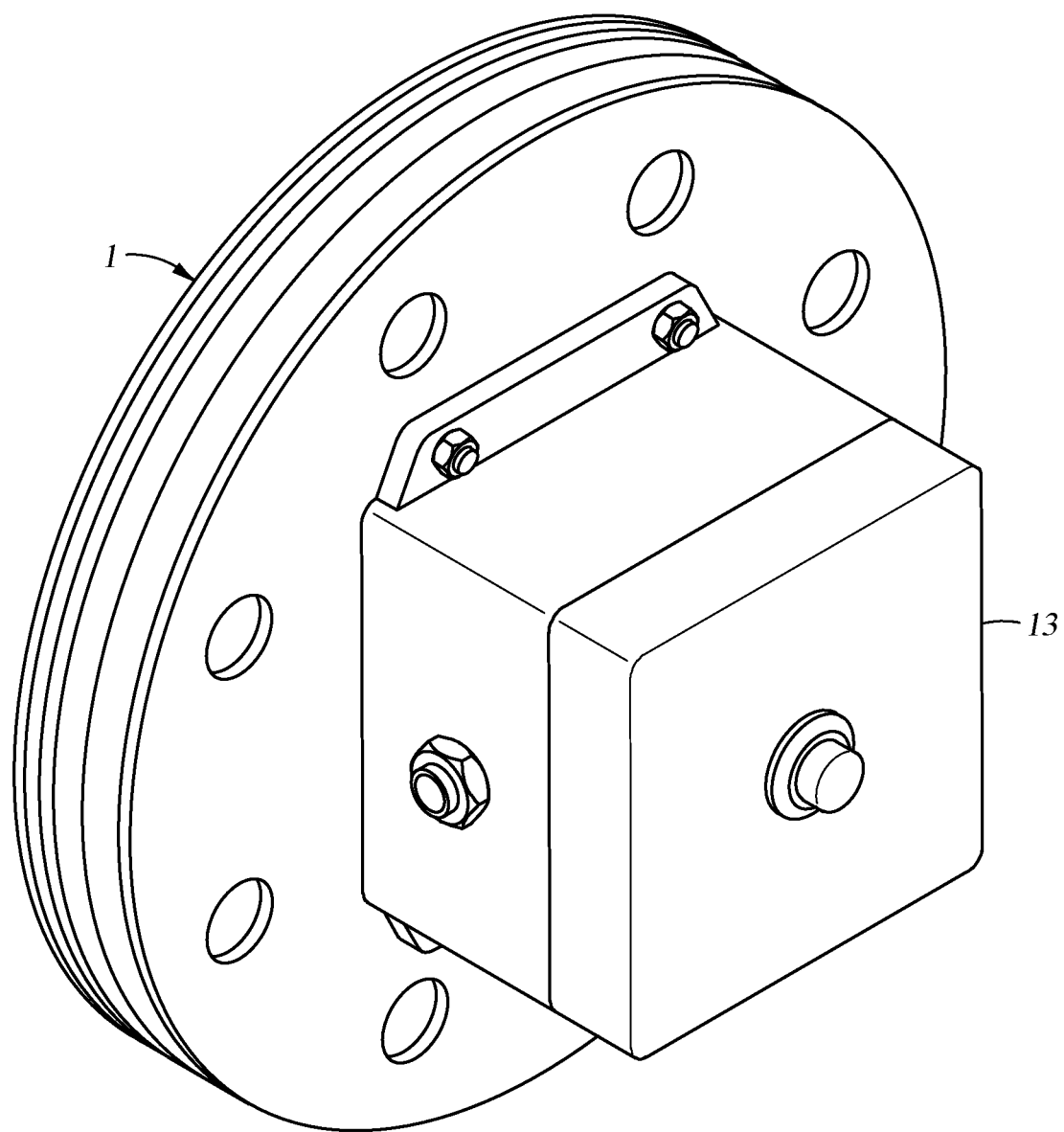
FIG. 3 is an isometric view of a coupon having a corrosion monitor mounted on a non-process side in an embodiment of this disclosure.

FIG. 1 is a schematic representation of one embodiment of the disclosure. In FIG. 1, a storage tank 2 used to store a corrosive liquid 3 includes a process side 5A, which contacts the corrosive liquid 3 and a non-process side 6A, which does not contact the corrosive liquid 3. A corrosion sensor coupon or blind flange coupon 1 is mounted on the storage tank 2 through flanged nozzle 4. In another embodiment, the corrosion sensor coupon 1 is mounted directly on the storage tank 2 sidewall, instead of on a flanged nozzle 4. FIG. 3 shows a blind flange coupon 1 for installation on a flanged nozzle 4. In the embodiment of FIG. 1, the blind flange coupon 1 is of unitary construction and is bolted directly to the flanged nozzle 4 on the storage tank 2. The blind flange coupon 1 could be mounted during the manufacturing of the storage tank 2 or retrofitted after manufacturing of the storage tank 2. The blind flange coupon 1 is able to be removed and replaced without requiring the corrosive liquid 3 to be drained from the storage tank 2.

Figure 2A:
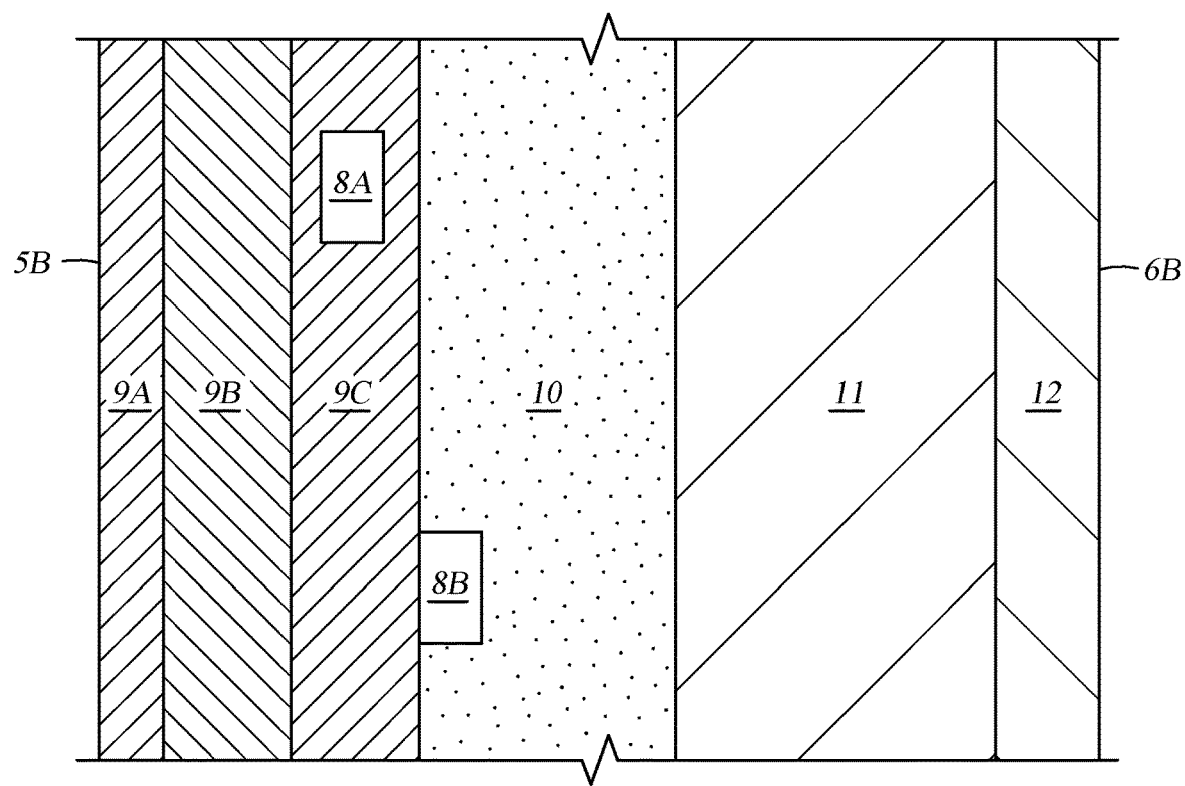
FIG. 2A is a cross-section of a coupon in an embodiment of this disclosure.

FIG. 2A is a cross-section of a portion of one embodiment of the coupon 1. The coupon 1 is composed of a process side 5B and a non-process side 6B, and contains one or more corrosion responsive members such as magnets 8A, 8B embedded in one or more inner surface layers 9A-C on the process side 5B of the coupon 1. The one or more inner surface layers 9A-C on the process side 5B of the coupon 1 should be manufactured from the same material and structure found on the process side 5A of the storage tank 2. In another embodiment the corrosion responsive members 8A, 8B are embedded in the storage tank 2 sidewall.

One embodiment of a corrosion laminate on the walls of a tank includes an inner surface composed of a glossy, resin-rich material approximately 10-15 mils thick, where the surface is 100% resin. Commonly, thermoset plastics are used in this application, including a thermoset polyester resin or a vinyl ester resin. The inner surface of the corrosion laminate provides corrosion control. Beneath the inner surface, a veil and veil backing provide support to the inner surface. In one embodiment, the veil and veil backing are a minimum of 80 mils thick and are composed of a 70:30+/−10% resin to reinforcement ratio. Together, the inner surface and veil and veil backing layers make a corrosion liner. Beneath the corrosion liner, are structural layers, which in this embodiment are composed of a 45:55+/−10% resin to reinforcement ratio and are a minimum of 250 mils thick. The specific thickness of the structural layers depends on the requirements of the specific design. Beneath the structural layers is an outer surface which is composed of parrifinated gelcoats or a paint system and sometimes contains a secondary veil for cosmetics.

The specific composition of the coupon 1 will normally match the composition of the storage tank 2. One embodiment of the coupon 1, seen in FIG. 2A, has three inner surface layers 9A-C with an inner layer 9A that is 10-40 mils thick and two additional interior layers 9B, 9C—that are both 40 mils thick. Beneath the inner surface layers 9A-C, an interior layer with a veil and veil backing 10 consist of resin and reinforcement and provide support to the inner surface 9A-C and prevent wicking of random chopped fibers. The veil and veil backing 10 are generally a minimum of 80 mils thick and are composed of a 70:30+/−10% resin to reinforcement ratio. Beneath the corrosion liner, are structural layers 11, which are composed of a 45:55+/−10% resin to reinforcement ratio and are generally a minimum of 250 mils thick. The specific thickness of the structural layers 11 depends on the requirements of the specific design. Beneath the structural layers 11 is an outer surface 12 which is composed of parrifinated gelcoats and sometimes contains a secondary veil for cosmetics.

Figure 2B:
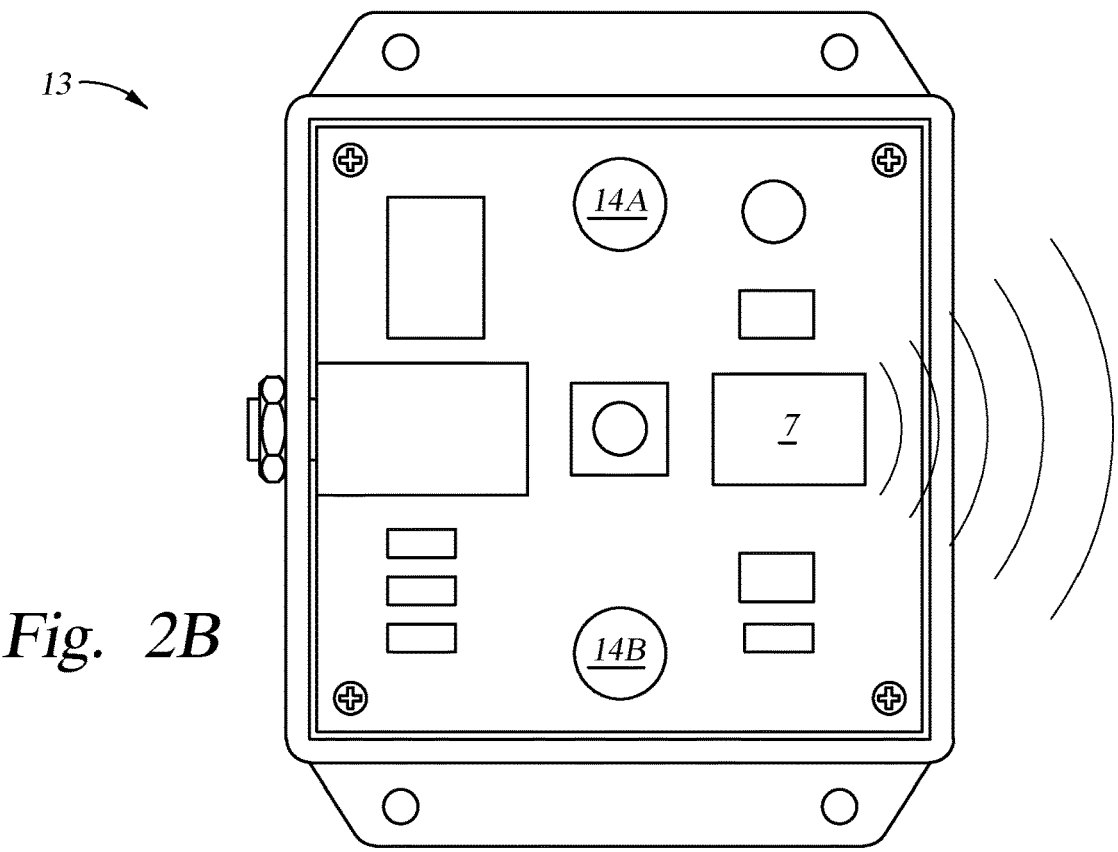
FIG. 2B is a schematic of a corrosion monitor in an embodiment of this disclosure.

Affixed to the non-process side 6B of the blind flange coupon 1 is a corrosion monitor 13 as shown schematically in FIG. 2B and in isometric view in FIG. 3. The corrosion monitor 13 contains one or more circuit boards, a wireless transceiver 7, electronic components and one or more sensors 14A, 14B configured to monitor a change in one or more physical properties of the corrosion responsive members. The corrosion monitor 13 can be configured to be powered with AC power or DC batteries. In the embodiment shown in FIG. 2B the corrosion monitor 13 has two sensors 14A, 14B. In another embodiment the corrosion monitor 12 has four sensors. In further embodiments, the corrosion monitor 12 has any suitable number of sensors. In one embodiment, the sensors 14A, 14B are Hall Effect sensors, which have a variable voltage output dependent on the magnetic field strength of the magnets 8A, 8B embedded in the one or more inner layers 9A-C. The sensors 14A, 14B are spaced from one another at a sufficient distance, so that each sensor 14A, 14B only detects the magnetic field from one magnet 8A, 8B. As the corrosive liquid 3 corrodes the process side 5A of the storage tank 2, the process side 5B of the coupon 1 will corrode at a similar rate. Overtime the corrosion will expose one or more of the magnets 8A, 8B to the corrosive liquid 3 and the corrosive liquid 3 will degrade one or more of the magnets 8A, 8B, varying the voltage output of the sensors 14A, 14B. The voltage output data is then transmitted via the wireless transceiver 7 to a gateway. The data can be transmitted via wired, wireless, IP or cellular network. The gateway sends the data to remote databases over the network. The gateway can also be used to configure the wireless transceiver 7 remotely. The user may locally check the status of the sensors 14A, 14B by pressing a button on the corrosion monitor 12. When the button is pressed, the corrosion monitor 12 will evaluate the data and indicate if there is an alarm situation. The gateway monitors the data and will alarm locally on the monitor if the sensor 14A, 14B fails. This is a fault protection in case the gateway cannot reach the remote databases. A monitoring, reporting and configuration system will record the incoming sensor values from the corrosion monitor 12. Alarm set points will be established for the sensor values. The database will contain historical raw data from the sensors 14A, 14B, alarm set points for user notification, and user contact information. The monitoring, reporting and configuration system is a software program, which looks at the data in the databases sent by the corrosion monitor 12 through the gateway. It will look at a specific time, scheduled by the user and/or set by default. If the data reported triggers an alarm value, the system will notify concerned parties. Notification could be via email or phone call or other means. The monitoring, reporting and configuration system will consist of one or more databases and a custom extraction and monitoring software service. The databases store and display raw data from the transceiver radios and sensor values. The custom extraction and monitoring software extracts data from the database on set schedules and triggers alarms when values are outside of a critical range. The custom extraction and monitoring software will record historical alarms in the database.

In the embodiment where the corrosion responsive members 8A, 8B are magnets, the magnets 8A, 8B embedded in the coupon 1 could be rare earth magnets or any other type of magnet known in the art that would produce a magnetic field of sufficient strength to be detected by the sensors 14A, 14B. In another embodiment the sensors 14A, 14B are photoelectric sensors and the corrosion responsive members 8A, 8B are photoelectric receivers whose optical properties change when exposed to the corrosive fluid in the storage tank 2. In another embodiment the sensors 14A, 14B are inductive proximity sensors and the corrosion responsive members 8A, 8B are made of a conductive material that will degrade when exposed to the corrosive liquid in the storage tank 2. As the conductive material degrades, the strength of the signal received by the inductive proximity sensors 14A, 14B would change. The corrosion responsive members 8A, 8B used in a given application would be chosen based on the response of the corrosion responsive members 8A, 8B to the corrosive liquid in the specific storage tank 2. By embedding one or more corrosion responsive members 8A, 8B at known depths in one or more layers 9A-C in the coupon 1, the monitoring, reporting and configuration system can determine a rate of corrosion of the inner layers 9A-C by monitoring the number of days the tank was in service until an alarm was triggered. After multiple alarms the rate of corrosion in the laminate can be determined. As an example, if the first alarm is set at 25 mils in the coupon and takes 400 days to alarm, the rate of corrosion would be 0.0625 mils/day. The corrosion rate of the first alarm would be expected to be different from the second through the fourth alarms because the composition of the laminate is different than in the deeper layers. In order to predict the corrosion rates in the laminate for a particular tank structure, jobsite environmental conditions, and chemical quality, as all of these are independent factors of individual corrosion rates, data are collected across many tanks of the same construction, providing an empirical relationship.

The present disclosure could be used to monitor and detect corrosion in storage tanks used to store a variety of corrosive liquids. Sodium hypochlorite stored in tanks for water treatment is one application for the corrosion sensor. The sensor could also be used with other corrosive liquids such as hydrochloric acid or sodium hydroxide.

While the foregoing is directed to embodiments of the present disclosure, other and further embodiments of the disclosure may be devised without departing from the basic scope thereof, and the scope thereof is determined by the claims that follow.

The invention claimed is:

1. A method of monitoring corrosion in a storage tank comprising:
    monitoring a change in one or more physical properties of one or more corrosion responsive members using one or more sensors, wherein the one or more sensors are located on a non-process side of a coupon coupled to the storage tank, the coupon comprising one or more inner surface layers on a process side of the coupon, a veil and veil backing layer, one or more structural layers, and an outer surface layer, and wherein the one or more corrosion responsive members are located internal to the one or more sensors and embedded in the one or more inner surface layers on the process side of the coupon.

2. The method of claim 1, wherein the one or more corrosion responsive members comprise one or more magnets, and wherein the monitoring comprises monitoring a change in a magnetic field strength of the one or more magnets resulting from degradation of the one or more magnets.

3. The method of claim 1, wherein the coupon is a blind flange coupon and wherein the blind flange coupon is mounted on a flanged nozzle.

4. The method of claim 1, wherein the coupon is mounted directly on a tank sidewall.

5. The method of claim 1, wherein the one or more corrosion responsive members are embedded in the one or more inner surface layers at different distances from the process side of the coupon.

6. The method of claim 1, wherein data from the one or more sensors is monitored locally or transmitted over a network monitored remotely.

* * * * *